(12) United States Patent
McCaughan

(10) Patent No.: US 7,617,697 B2
(45) Date of Patent: Nov. 17, 2009

(54) IN-GROUND GEOTHERMAL HEAT PUMP SYSTEM

(76) Inventor: Michael McCaughan, 1068 Judy Ln., Stanley, VA (US) 22851

( * ) Notice: Subject to any disclaimer, the term of this patent is extended or adjusted under 35 U.S.C. 154(b) by 262 days.

(21) Appl. No.: 11/803,473

(22) Filed: May 15, 2007

(65) Prior Publication Data

US 2007/0266722 A1 Nov. 22, 2007

Related U.S. Application Data

(60) Provisional application No. 60/800,602, filed on May 16, 2006.

(51) Int. Cl.
*F25D 23/12* (2006.01)
(52) U.S. Cl. .......................... 62/260; 165/45; 62/324.1
(58) Field of Classification Search .................. 62/260; 165/45
See application file for complete search history.

(56) References Cited

U.S. PATENT DOCUMENTS

| | | | |
|---|---|---|---|
| 2,007,406 A | | 7/1935 | Miller |
| 2,664,721 A | * | 1/1954 | Intagliata ..................... 62/260 |
| 3,563,304 A | * | 2/1971 | McGrath ..................... 165/240 |
| 4,042,012 A | * | 8/1977 | Perry et al. ................... 165/45 |
| 4,305,260 A | | 12/1981 | Backlund |
| 4,339,929 A | | 7/1982 | Fitzpatrick et al. |
| 4,375,831 A | * | 3/1983 | Downing, Jr. ............... 165/48.1 |
| 4,993,483 A | * | 2/1991 | Harris ......................... 165/45 |
| 5,136,855 A | * | 8/1992 | Lenarduzzi .................. 62/129 |
| 5,477,703 A | * | 12/1995 | Hanchar et al. .............. 62/260 |
| 5,875,644 A | | 3/1999 | Ambs et al. |
| 6,138,744 A | * | 10/2000 | Coffee .......................... 165/45 |
| 6,484,794 B1 | * | 11/2002 | Schulak et al. ................ 165/45 |
| 2003/0121641 A1 | * | 7/2003 | Schulak et al. ................ 165/45 |
| 2004/0144115 A1 | * | 7/2004 | Xu ............................... 62/260 |

FOREIGN PATENT DOCUMENTS

| | | |
|---|---|---|
| FR | 2 716 958 | 9/1995 |
| FR | 2 796 136 | 1/2001 |
| JP | 4-113138 | 4/1992 |
| JP | 4-302931 | 10/1992 |

* cited by examiner

*Primary Examiner*—Cheryl J Tyler
*Assistant Examiner*—Justin Loffredo
(74) *Attorney, Agent, or Firm*—Kilyk & Bowersox, P.L.L.C.

(57) ABSTRACT

An in-ground geothermal heating and cooling system for a building is provided. The system can include a buried ground source heat pump, a heat exchanger, and a ground loop circuit buried to a depth below the regional frost line. The system can also include a buried ground source heat pump buried inside a building to be heated. The system can also include an in-building heat exchanger disposed in a building, and an evaporative loop running from the ground source heat pump to the in-building heat exchanger. A method for installing such an in-ground geothermal heating and cooling system is also provided.

19 Claims, 3 Drawing Sheets

IN-GROUND GEOTHERMAL HEAT PUMP SYSTEM

CROSS-REFERENCE TO RELATED APPLICATION

The present application claims a priority benefit from U.S. Provisional Patent Application No. 60/800,602 filed May 16, 2006, which is incorporated herein in its entirety by reference.

FIELD

The present invention relates to in-ground geothermal heating and cooling systems.

BACKGROUND

A conventional air-source heat pump is illustrated in FIG. 1. The heat pump in FIG. 1 typifies a "split" system comprising an outdoor heat exchanger coil and refrigerant compressor unit and an indoor heat exchanger coil contained within the building's air handling system. This heat pump can be operated in both cooling and heating modes to transfer heat to and from an outside heat source/sink.

A heat pump unit is positioned inside a housing 100 situated on the ground surface. The unit includes compressor 102, accumulator 106, heat exchanger coil 110, fan 112, reversing valve 130, and several refrigerant lines 120 and 122. The operation and interrelationship of these components is generally well known to those skilled in the art and will not be discussed in detail, however, a general summary of the function of each of theses components will be provided.

Compressor 102 pumps a refrigerant through the heat pump circuit. In cooling mode, compressor 102 pressurizes vaporized refrigerant, heating the refrigerant to a temperature higher than the outside air (typically in the range of 120° F.-140° F.). Pressurized refrigerant vapor exits compressor 102 and enters reversing valve 130 through port 138. Reversing valve 130 directs the refrigerant through port 132, through line (not shown) and into heat exchanger coil (condenser) 110. The refrigerant vapor circulates through heat exchanger coil 110 spontaneously losing heat to the outside air while condensing to a liquid. A circulating fan 112, powered by fan motor 108, forces air across the heat exchanger coil 110 and increases the rate of heat dissipation and heat exchange. The refrigerant then leaves heat exchanger coil 110 as a liquid, still under high pressure, and enters line 122 through port 118. Line 122 carries the liquid refrigerant outside heat pump housing 100, through a wall 124, and into a building to be cooled. The liquid refrigerant is then directed to an indoor air handler unit 126.

The details of an indoor heat exchange system are well known to one of ordinary skill in the art and are not schematically shown. Typically, in the indoor heat exchange system, the pressurized liquid refrigerant passes through an expansion valve causing a large pressure drop that vaporizes the refrigerant. The pressure change and the liquid to vapor phase change cools the refrigerant to a temperature lower than the inside air (typically about 40° F.-50° F.). The cooled refrigerant gas is then directed to an indoor heat exchanger coil (evaporator) to exchange heat with the indoor air and then passes out of the building.

The refrigerant gas leaves the building through line 120 and travels back to outdoor heat pump unit 100. The refrigerant gas is then directed through port 116 and line (not shown) through reversing valve 130 and port 136 to accumulator 106. From accumulator 106, the refrigerant vapor is then directed into the compressor 102 for the same circulation.

In heating mode, reversing valve 130 is switched such that the high-pressure output of compressor 102 is directed toward the indoor heat exchange system 126. The high-pressure, high temperature refrigerant vapor passes through reversing valve 130 and port 136 to line 120. The refrigerant circulates through the indoor heat exchange system where the refrigerant condenses and gives up its latent heat to the indoor air. The liquid refrigerant then travels back to heat pump 100 through line 122.

The liquid refrigerant passes through an expansion valve (not shown) and circulates through heat exchanger coil 110 where it gains latent heat from the outside air. The refrigerant then travels through port 132 to the reversing valve 130, and to accumulator 106 through port 134. The refrigerant vapor then returns to the compressor 102 where the cycle begins anew.

Existing above ground air-source heat pumps and air conditioning units are inefficient, noisy, unsightly, and take up ground space.

During the winter heating season, air-source heat pumps are less effective when the air temperature falls below 25° F.-35° F. To handle such conditions, the heating system is often supplied with a supplemental heating system, such as electrical resistance strips, to further warm the building supply air after it leaves the indoor coil.

Also during the heating season, moisture in the air outside may freeze on the outdoor coil if its surface temperature drops below 32° F. Therefore, when outside temperatures fall below about 40° F., an air-source heat pump will periodically enter a defrost cycle, during which the reversing valve intermittently sends hot refrigerant through the outdoor coils.

Exterior geothermal heat pumps are exposed to outdoor conditions of extreme heat and cold, and thus require supplemental heat and/or high percentage solutions of antifreeze to prevent them from freezing in colder climates. This reduces overall efficiency. Interior, or in-building geothermal heat pump systems exist but they create machine noise and vibration and take up interior space.

SUMMARY

The present teachings relate to in-ground geothermal heating and cooling systems for a building. The geothermal systems can replace, for example, an air-source heat pump or air conditioning unit in commercial and residential buildings, in new home construction or as a retrofit to an existing home.

The geothermal heating and cooling system comprises a buried ground source heat pump buried in a hole in the ground. The heat pump can comprise a buried heat exchanger and a compressor, at least the buried heat exchanger being buried to a depth below the regional frost line. The system further comprises a buried ground loop circuit operably communicating with the ground source heat pump, the buried ground loop circuit being adapted to collect and disperse ground source heat. The system further comprises an in-building heat exchanger disposed in a building and an evaporative loop running from the ground source heat pump to the in-building heat exchanger.

The geothermal heating and cooling system can comprise a ground source heat pump buried in a hole in the ground inside a building to be heated and comprising a buried heat exchanger and a compressor. The system can further comprise a buried ground loop circuit operably communicating with the ground source heat pump, the buried ground loop circuit being adapted to collect and disperse ground source heat. The system can further comprise an in-building heat exchanger disposed in a building and an evaporative loop running from the ground source heat pump to the in-building heat exchanger.

The present teachings additionally relate to a method for installing in-ground geothermal heating and cooling systems. The installation method comprises forming a recess in the ground that extends below the depth of a regional frost line, the ground having a surface, positioning a housing in the recess in a position such that at least a portion of the housing is disposed below the regional frost line, positioning a ground source heat pump and a water to evaporant heat exchanger in the housing below the regional frost line, and installing an evaporative loop from the ground source heat pump to an inside of a building.

Geothermal heating and cooling systems provide higher efficiency and lower operating costs over conventional air-source systems. Geothermal systems use the earth's energy, just below the surface, to heat and cool a home or other building. A few feet beneath the surface, the earth's temperature remains fairly constant, ranging from about 45° F. to 70° F. in most of the world's regions. Geothermal systems take advantage of this constant temperature to provide extremely efficient heating and cooling. A geothermal heat pump can use 25%-50% less electricity on average than a conventional air source heating or cooling system.

A buried geothermal heat pump operates in virtual silence without a noisy fan and with its mechanical parts buried under ground. In an exterior buried geothermal heat pump, the water pump, heat exchanger and compressor are located outside, below ground, and isolated from the building. In addition, a buried geothermal heat pump remains unobtrusive and frees up additional outdoor space.

In a buried geothermal heat pump, the water pump and water coil are below the regional frost line and are not subjected to extreme heat and cold, resulting in higher overall efficiencies, and lower operating costs. While many parts of the country experience seasonal temperature extremes, from scorching heat in the summer to sub-zero cold in the winter, a few feet below the earth's surface the ground remains at a relatively constant temperature. Geothermal heat pumps use the constant temperatures of the earth as the exchange medium instead of the outside air temperature. This allows the system to reach high efficiencies on the coldest winter nights and hottest summer days.

These and other objects, advantages, and features of the invention will be more readily understood and appreciated by reference to the detailed description of the various embodiments and the drawings.

DETAILED DESCRIPTION OF THE PRESENT INVENTION

According to various embodiments, the in-ground geothermal heat exchange system of the present teachings can be operated in a cooling mode, in a heating mode, or in both a cooling mode and a heating mode. With reference to the drawings, FIG. 2 depicts an in-ground geothermal heating and cooling system that can operate in both heating and cooling modes in accordance with an embodiment of the present teachings.

Figure 1:
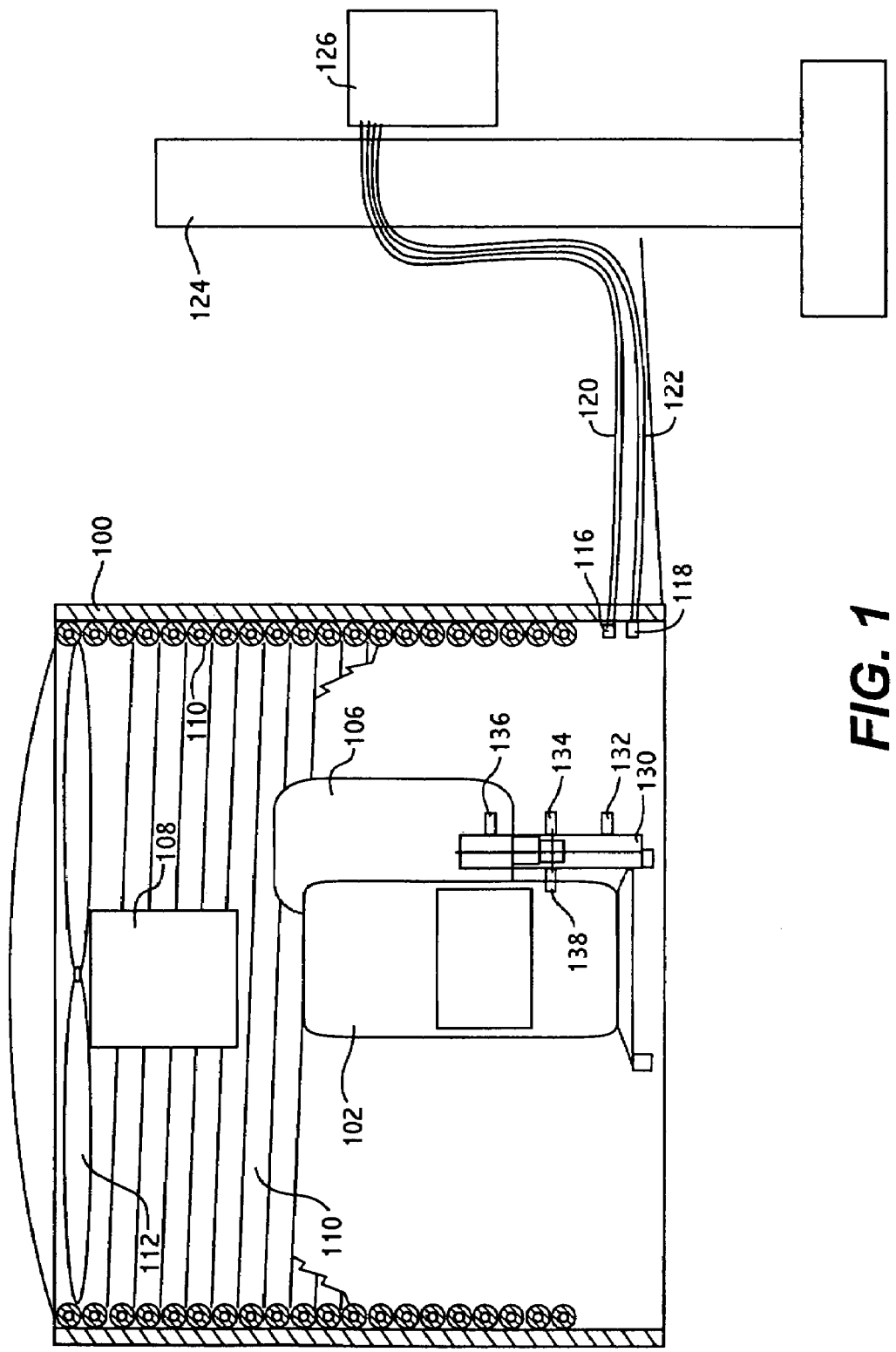
FIG. 1 shows a schematic diagram of a conventional air source heat pump system existing in the art.
Figure 2:
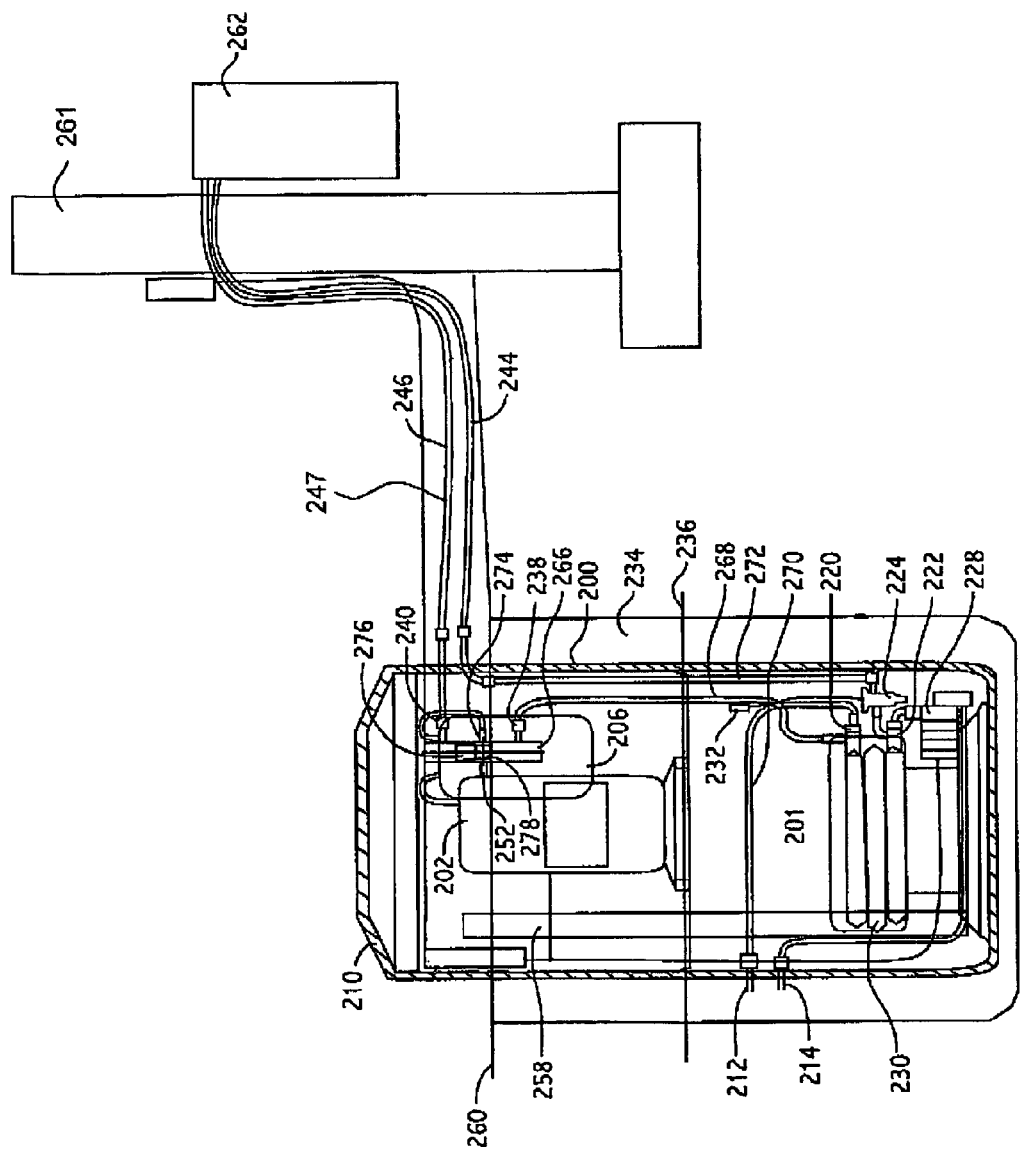
FIG. 2 shows a schematic diagram of an embodiment of an in-ground geothermal heating and cooling system according to the present teachings.

As shown in FIG. 2, the in-ground geothermal system can comprise a housing 200 positioned in a recess 234 in the ground. Housing 200 can be reinforced to withstand ground force pressure, can be sealed with a lid 210, and can be water-tight. At least a portion of housing 200 can be disposed below a regional frost line 236. The portion of housing 200 located below regional frost line 236 can be disposed to a depth of, for example, about one to ten feet below regional frost line 236. One of ordinary skill in the art would have knowledge of the depth of the regional frost line in any geographic area.

According to various embodiments, and as shown in FIG. 2, the geothermal system can comprise a ground source heat pump (shown generally as 201) disposed within housing 200. Ground source heat pump 201 can comprise a compressor 202, an accumulator 206, a heat exchanger 230, a water pump 228, and a reversing valve 266. As shown, heat exchanger 230 can be buried to a depth below regional frost line 236.

According to various embodiments, heat exchanger 230 can be a water to evaporant heat exchanger adapted to exchange heat with a thermal fluid in a ground loop circuit 270. According to various embodiments, ground loop circuit 270 can be provided in the ground below regional frost line 236. Ground loop circuit 270 can comprise a liquid disposed therein.

According to various embodiments, as shown in FIG. 2, a pump 228 can be buried below the regional frost line. Pump 228 can be adapted to circulate a liquid through the buried ground loop circuit.

According to various embodiments, and as shown in FIG. 2, compressor 202, accumulator 206, and reversing valve 266 can be disposed in housing 200 above regional frost line 236. Compressor 202, accumulator 206, and reversing valve 266 can be positioned in housing 200 such that access to these components can be easily gained from the top of housing 200.

According to various embodiments, the geothermal heating and cooling system can operate in heating mode, cooling mode, or in both heating and cooling modes. According to the embodiment exemplified in FIG. 2, the system can comprise heat pump 201 that can operate in both heating and cooling modes.

According to various embodiments, when heat pump 201 operates in a cooling mode, compressor 202 pressurizes evaporant vapor. The pressurized evaporant vapor exits compressor 202 through port 252 and enters reversing valve 266. Reversing valve 266 then directs the evaporant through port 238 and into line 268. The evaporant passes through line 268 and enters heat exchanger 230. The evaporant circulates through heat exchanger 230 and condenses while spontaneously losing heat to a ground loop fluid circulating in heat exchanger 230 and a buried ground loop circuit 270. The evaporant exits the heat exchanger 230, bypasses through thermostatic expansion valve 224, and enters line 272. Line 272 then carries the cooled evaporant liquid out of housing 200 to external line 244, through a wall 261, and into a building to be cooled. The evaporant is then directed to an indoor heat exchange system 262 for cooling of the building's internal air.

When the evaporant exits the indoor heat exchange system 262, it then travels out of the building and back to buried housing 200 and heat pump 201 though external line 246. The evaporant is then directed to accumulator 206 through reversing valve 266, port 240 and port 274. From accumulator 206, the evaporant is directed into compressor 202 for continued circulation. External lines 244 and 246 are apart of evaporative loon 247 that runs from the ground source heat pump to an in-building heat exchanger.

According to various embodiments of the geothermal heating and cooling system, and as shown in FIG. 2, when heat pump 201 operates in heating mode, reversing valve 266 reverses the evaporant flow direction. Typically, solenoid 276 activates a piston or slide 278 within reversing valve 266 such that the high-pressure evaporant output of compressor 202 is directed through port 252 and port 240, into external line 246, and towards indoor heat exchange system 262. The high pressure, high temperature, evaporant vapor circulates through indoor heat exchange system 262, for heating the building internal air, and then travels back to the heat pump 201 through external line 244.

According to the embodiment shown in FIG. 2, the evaporant is then directed to heat exchanger 230 through line 272. The evaporant passes through thermostatic expansion valve 224 and enters heat exchanger 230. As the cooled evaporant travels through heat exchanger 230, it gains latent heat from ground loop fluid circulating in the ground loop 270. The evaporant exits heat exchanger 230 through line 268 and returns to accumulator 206 through port 238, reversing valve 266, and port 274. From accumulator 206, the evaporant then returns to compressor 202 where the circulating cycle begins anew.

According to various embodiments, the in-ground geothermal heating and cooling system can comprise a ground loop circuit buried below a regional frost line. The buried ground loop circuit can include a pump to circulate a ground loop fluid through the buried ground loop circuit. The buried ground loop circuit can utilize naturally occurring geothermal heat as a heat source in the winter and as a heat sink in the summer. The ground loop fluid circulating through the ground loop circuit can be used to effect a thermal heat exchange with evaporant circulating through a heat pump system.

As shown by the embodiment in FIG. 2, a ground loop circuit 270 can pass out of housing 200 through conduit 214, and return to housing 200 through conduit 212. The system can comprise pump 228 to circulate a ground loop fluid through ground loop 270. Ground loop circuit 270 connects with heat exchanger 230 through input port 220 and return port 222. According to various embodiments, pump 228 can operate to circulate the ground loop fluid in either direction through ground loop circuit 270.

According to various embodiments, during normal operation, pump 228 will operate to push ground loop fluid through ground loop circuit 270, circulating through conduit 214 and returning through conduit 212, through a port 220 and a port 222 to pump 228. According to various embodiments, pump 228 can be operated to pump the flow of ground loop fluid in the reverse direction.

According to various embodiments, a ground loop circuit can be installed, for example, either horizontally or vertically in the ground below a regional frost line, or submerged in water in a pond, lake, or river. According to various embodiments, the ground loop circuit can comprise a recirculating closed circuit. According to other embodiments, the ground loop circuit can comprise an open circuit.

In some embodiments, regardless of the depth of the regional frost line, the ground loop circuit, the buried heat exchanger, or both, can be buried in the ground to a depth of at least two feet, for example, to a depth of at least three feet, to a depth of at least four feet, to a depth of at least five feet, or to a depth of at least six feet. In some embodiments, regardless of the depth of the regional frost line, the ground loop circuit, the buried heat exchanger, or both, can be buried in the ground to a depth of at least ten feet.

According to various embodiments, a horizontal closed ground loop can be used, for example, when adequate yard space is available and trenches are easy to dig. Typically a series of parallel plastic pipes can be laid in a trench dug three to six feet below the ground. The trench can be then backfilled to bury and conceal the pipes. According to various embodiments, the pipe can be coiled into a slinky shape in order fit more pipe into shorter trenches.

According to various embodiments, a vertical closed ground loop configuration can be used, for example, for homes where yard space is insufficient to permit horizontal loops, the earth is rocky, or for retro fit applications where minimum destruction of the landscaping is desired. In a vertical system, typically vertical holes can be dug in the ground about 150 to 250 feet deep. Each hole can contain a loop of pipe with a u-bend configuration at the bottom. The vertical pipes can then be connected to a horizontal pipe which is also concealed underground. The horizontal pipe can carry the ground loop fluid to and from the geothermal heat pump system.

According to various embodiments, a pond closed loop can be used. In this system, the ground loop fluid can circulate through piping in a closed system submerged under water from a pond, lake, or river.

According to various embodiments, an open loop system can be used. In this system, in-ground water from an aquifer or other water supply source can be piped through the loop to the heat pump.

According to various embodiments, and as shown in FIG. 2, the in-ground geothermal heating and cooling system can comprise heat exchanger 230 buried below regional frost line 236. Heat exchanger 230 can comprise, for example, a liquid-to-evaporant heat exchanger of a type well known to one of ordinary skill in the art. Typical liquid-to-evaporant heat exchangers include, for example, water-to-evaporant heat exchangers, tube-in-tube heat exchangers, and counter flow heat exchangers, for example, of a helical, elliptical, or u-bend configuration.

According to various embodiments, and as shown in FIG. 2, the in-ground geothermal heating and cooling system can comprise pump 228 adapted to circulate ground loop fluid through buried ground loop circuit 270. Pump 228 can comprise, for example, a water pump of a type and capacity well known to one of ordinary skill in the art. According to various embodiments, the ground loop fluid circulating through the buried ground loop circuit can comprise a liquid such as water, antifreeze, or a combination thereof.

According to various embodiments, the ground loop circuit can comprise piping or other conduit material. The piping can comprise a material that is durable but that allows heat to pass through efficiently. The piping can comprise a material that does not retard the exchange of heat between the ground and the ground loop fluid in the ground loop. The piping can comprise plastic, for example, high-density polyethylene, polyvinylchloride, polypropylene, polybutylene, filled polymers, polymers and plastic filled with thermally conductive filler, and the like. In some embodiments, the piping can instead comprise a metal, such as copper, aluminum, stainless steel, and the like.

According to various embodiments, the geothermal heating and cooling system can comprise a reservoir 258 in fluid communication with ground loop circuit 270. During normal operation, ground loop fluid can potentially leak from ground loop circuit 270, the fluid can expand or contract, or air bubbles can form and become trapped within ground loop circuit 270. Reservoir 258 can provide access to ground loop circuit 270 so that additional ground loop fluid can be added to or removed from ground loop circuit 270 and so that trapped air can be released.

According to various embodiments, and as shown in FIG. 2, the geothermal heating and cooling system can comprise a thermostatic expansion valve 224. The thermostatic expansion valve 224 can be disposed at or near the regional frost line and in some embodiments below the regional frost line. Thermostatic expansion valve 224 can comprise a metering device to adjust the flow of evaporant in the system. According to various embodiments, thermostatic expansion valve 224 can adjust the flow of evaporant, depending on changing weather conditions and system demands. According to various embodiments, a sensor 232 can operate to control thermostatic expansion valve 224.

According to various embodiments, and as shown in FIG. 2, the in-ground geothermal heating and cooling system can comprise compressor 202 adapted to circulate an evaporant through an evaporant loop. Compressor 202 can be buried in the ground to a depth that is above, at, or below the regional frost line. If above the regional frost line, ready access to compressor 202 can be provided for service, repair, maintenance, and/or replacement.

According to various embodiments, compressor 202 can comprise at least one of a reciprocating compressor, rotary screw compressor, centrifugal compressor, and scroll-type compressor. According to various embodiments, compressor 202 can comprise a scroll-type compressor.

According to the embodiment shown in FIG. 2, the in-ground geothermal heating and cooling system can operate in both heating and cooling modes. The changeover between the heating and cooling modes can be accomplished by reversing valve 266, such as for example, a four-way reversing valve. According to various embodiments, the geothermal system can operate as a straight cooling system, or as a straight heating system. The system can operate with or without a reversing valve.

According to various embodiments, the geothermal heating and cooling system can comprise an evaporant in the evaporative loop. The evaporant can comprise, for example, at least one of halomethane, chlorofluorocarbon, hydrofluorocarbon, hydrochlorofluorocarbon, liquid ammonia, propane, butane, carbon dioxide, and combinations thereof.

According to various embodiments, the geothermal heating and cooling system can comprise an in-building heat exchanger. In some embodiments, the heat exchanger can comprise an air-to-evaporant heat exchanger. In other embodiments, the heat exchanger can comprise a liquid-to-evaporant heat exchanger. According to various embodiments, the in-building heat exchanger can comprise a radiator, an air handler such as a fan, a combination thereof, and the like.

According to various embodiments, the present teachings comprise a method for installing a geothermal heating and cooling system. The method can comprise forming a recess in the ground that extends below the depth of a regional frost line, the ground having a surface, positioning a housing in the recess in a position such that at least a portion of the housing is disposed below the regional frost line, positioning a ground source heat pump in the housing and a water-to-evaporant heat exchanger below the regional frost line, and installing an evaporative loop from the ground source heat pump to an inside of a building.

According to various embodiments, the method can be used to replace pre-existing above ground heating and cooling systems, such as, for example, a pre-existing air-source heat pump. According to various embodiments, the method is used to provide an original heating and cooling system, for example, in new home construction.

According to various embodiments, the depth of a recess 234 can be chosen to extend below regional frost line 236. Housing 200 can be positioned in recess 234 such that housing 200 extends above the surface of the ground 260. According to various embodiments, the method can comprise selecting a size of housing 200, from a plurality of different sizes, to fit in recess 234 and extend above the ground 260 to a desired height. The housing can extend above the ground 260, or can be essentially level with the ground 260.

Figure 3:
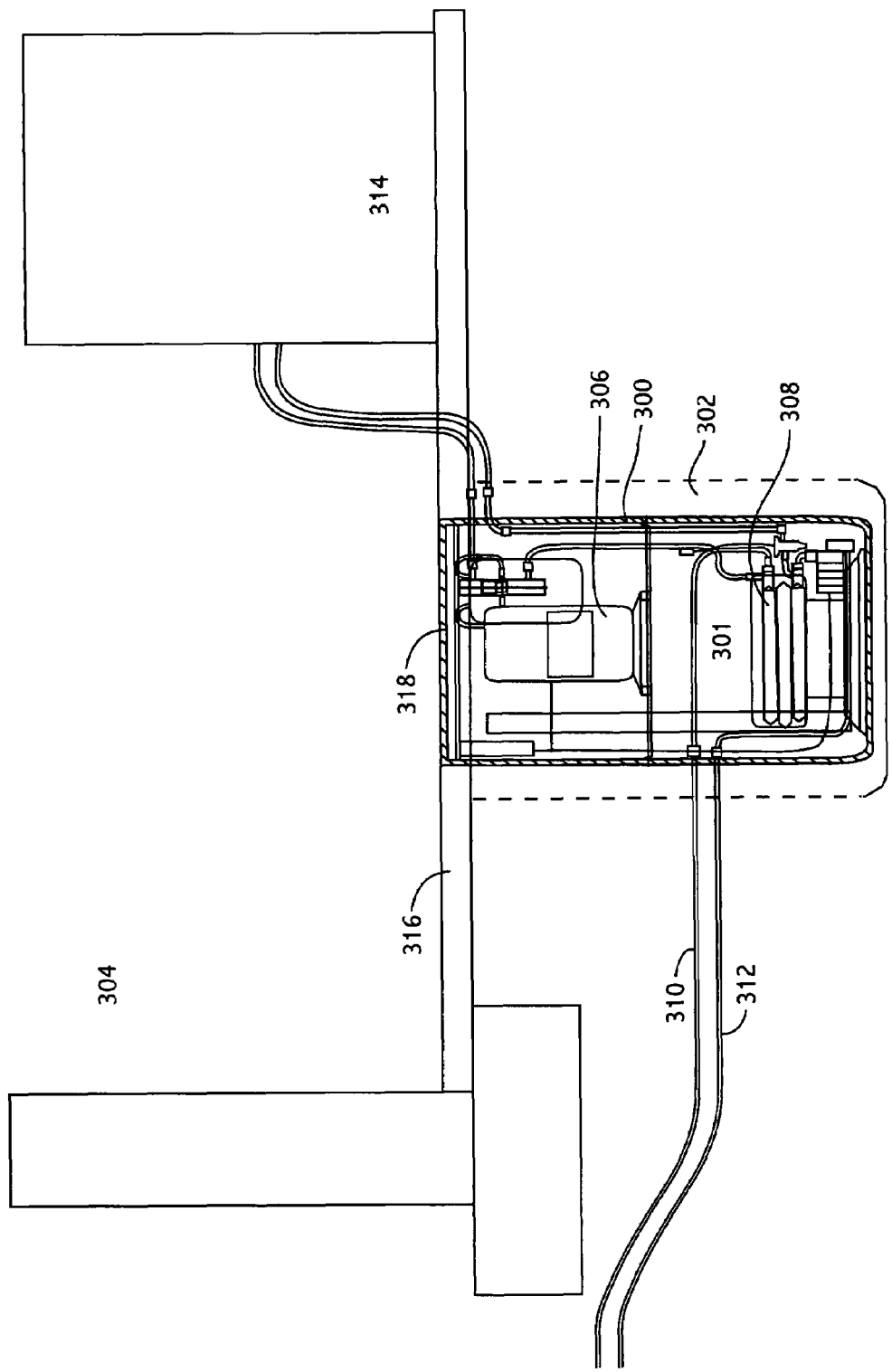
FIG. 3 shows a schematic diagram of an embodiment of an in-ground geothermal heating and cooling system according to the present teachings.

According to various embodiments, the geothermal heating and cooling system can comprise a ground source heat pump sunken in a recess in the bottom floor of a building to be heated, for example, buried in a hole in the ground inside a building to be heated. With reference to the drawings, FIG. 3 depicts a geothermal system comprising a housing 300 positioned in a recess in the ground 302 inside a building to be heated 304. A ground source heat pump (shown generally as 301), disposed within housing 300, can comprise a compressor 306 and a heat exchanger 308. The geothermal system can comprise a ground loop circuit 310 and 312, an in-building heat exchanger 314, and an evaporative loop 320 and 322 running from ground source heat pump 301 to in-building heat exchanger 314.

According to various embodiments, as shown in FIG. 3, ground source heat pump 301 can be sunken in the recess and/or buried in the ground, inside building to be heated 304. Ground source heat pump 301 can be disposed within housing 300 at a depth below the slab foundation 316. According to various embodiments, housing 300 can be positioned in recess 302 such that the top of housing 300 and housing cover 318 are essentially level with slab foundation 316.

In some embodiments, recess 302 can comprise and/or be defined by one or more of a wall and a bottom that can comprise a concrete material. Recess 302 can have any suitable shape and can include, for example, a flat bottom and vertical walls.

According to various embodiments, the method of installing a geothermal heating and cooling system can further comprise, selecting a length of a neck from a plurality of different lengths, the length extending from the surface of the ground surrounding the recess to the housing, attaching a neck having the selected length to the housing. This method can be used to adjust the length of the housing so that at least a portion of the housing is below the depth of the regional frost line and can extend to the surface of the ground. The variable neck length can also be used to adjust the height of the housing above the ground surface.

According to various embodiments, the method can further comprise back-filling the recess, with the housing and neck attached in the recess, below the regional frost line. According to various embodiments, the method can comprise positioning the ground source heat pump by passing the ground source heat pump through the neck after the neck has been attached to the housing.

According to various embodiments, the method can further comprise circulating an evaporant through an evaporative loop from a ground source heat pump to an inside of a building, and back, wherein the evaporant is in the form of a liquid in at least a portion of the evaporative loop.

According to various embodiments of the method, the heat pump can comprise an air conditioning unit.

Those skilled in the art can appreciate from the foregoing description that the present teachings can be implemented in a variety of forms. Therefore, while the devices, systems, and methods herein have been described in connection with particular embodiments and examples thereof, the present teachings should not be so limited. Various changes and modifications may be made without departing from the present teachings.

What is claimed is:

1. An in-ground geothermal heat exchange system comprising:
    a housing comprising a removable lid, the housing being sealed water-tight, reinforced to withstand ground force pressure, and positioned in a recess in surrounding ground having a regional frost line;
    a ground source heat pump disposed in the housing, comprising a heat exchanger, a compressor, a water pump, and a reversing valve, wherein the heat exchanger and the water pump are disposed in the housing below the regional frost line, and the compressor and the reversing valve are disposed in the housing above the regional frost line, each of the compressor and the reversing valve being positioned such that when the removable lid is removed from the housing, the compressor and the reversing valve are accessible from above the housing;
    a buried ground loop circuit comprising a portion disposed in the housing, wherein the portion in the housing is positioned entirely below the regional frost line and is in operable communication with the ground source heat pump, the buried ground loop circuit being adapted to collect and disburse ground source heat;
    an in-building heat exchanger disposed in a building; and
    an evaporative loop running from the ground source heat pump to the in-building heat exchanger.

2. The system of claim 1, wherein the heat pump comprises an air conditioning unit.

3. The system of claim 1, further comprising an evaporant disposed in the evaporative loop.

4. The system of claim 1, wherein the compressor comprises a scroll-type compressor.

5. The system of claim 1, further comprising a pump adapted to circulate a liquid through the buried ground loop circuit.

6. The system of claim 5, further comprising a liquid disposed in the buried ground loop circuit, wherein the liquid comprises water.

7. The system of claim 5, further comprising a liquid disposed in the buried ground loop circuit, wherein the liquid comprises anti-freeze.

8. The system of claim 1, wherein the buried ground loop circuit comprises a recirculating closed circuit.

9. The system of claim 1, wherein the buried ground loop circuit comprises piping.

10. The system of claim 1, further comprising an evaporant in the evaporative loop, wherein the evapormnt comprises at least one of halomethane, chiorofluorocarbon, hydrofluorocarbon, hydrochiorafluorcarbon, liquid ammonia, propane, butane, carbon dioxide, and combinations thereof.

11. The system of claim 1, wherein the in-building heat exchanger comprises an air-to-evaporant heat exchanger.

12. The system of claims 1, wherein the in-building heat exchanger comprises a liquid-to-evaporant heat exchanger.

13. A method comprising:
    forming a recess in ground having a regional frost line at a depth, the recess extending below the depth of the regional frost line, the ground having a surface;
    positioning a housing in the recess in a position such that at least a portion of the housing is disposed below the regional frost line;
    positioning a ground source heat pump in the housing, the ground source heat pump comprising a heat exchanger, a water pump, a compressor, and a reversing valve, the ground source heat pump being disposed in the housing such that the heat exchanger and the water pump are positioned below the regional frost line, and the compressor and the reversing valve are positioned above the regional frost line;
    positioning a water to evaporant heat exchanger below the regional frost line; and
    installing an evaporative loop from the ground source heat pump to an inside of a building.

14. The method of claim 13, further comprising selecting a length of a neck from a plurality of different lengths, the length extending from the surface of the ground surrounding the recess to the housing, and attaching a neck having the selected length to the housing.

15. The method of claim 14, further comprising circulating an evaporant through the evaporative loop from the ground source heat pump to the inside of the building, and back, wherein the evaporant is in the form of a liquid in at least a portion of the evaporative loop.

16. The method of claim 13, wherein the heat pump comprises an air conditioning unit.

17. The method of claim 14, wherein the positioning a ground source heat pump further comprises passing the ground source heat pump through the neck after the neck has been attached to the housing.

18. The system of claim 1, wherein the ground source heat pump further comprises an accumulator disposed in the housing above the regional frost line and being positioned such that when the removable lid is removed from the housing the accumulator is accessible from above the housing.

19. The method of claim 13, wherein the ground source heat pump further comprises an accumulator disposed in the housing above the regional frost line.

* * * * *